United States Patent [19]

Ireland

[11] 4,356,989
[45] Nov. 2, 1982

[54] RESILIENT SUCTION CUP WITH SOFT PLIABLE SEALING GASKET

[76] Inventor: Jack W. Ireland, 664 Merriman Rd., Akron, Ohio 44303

[21] Appl. No.: 164,235

[22] Filed: Jun. 30, 1980

[51] Int. Cl.³ .............................................. F16B 47/00
[52] U.S. Cl. ................................. 248/206 R; 269/21; 279/3; 51/235
[58] Field of Search .................. 248/206 R, 362, 363, 248/467; 220/226; 279/3; 269/21; 294/64 R; 51/235; 277/226

[56] References Cited

U.S. PATENT DOCUMENTS

| | | | |
|---|---|---|---|
| 276,336 | 4/1883 | Baumeister | 248/206 R X |
| 380,309 | 4/1888 | Berliner | 248/206 R |
| 799,922 | 9/1905 | Moxham | 279/3 X |
| 829,546 | 8/1906 | Schou | 277/226 |
| 998,718 | 7/1911 | Schultze | 279/3 |
| 1,237,127 | 8/1917 | Watson et al. | 294/64 R X |
| 2,127,181 | 8/1938 | Mattern | 248/206 R X |
| 2,597,543 | 5/1952 | Suben | 51/235 |
| 2,916,059 | 12/1959 | Wong | 294/64 R X |
| 3,147,016 | 9/1964 | Traufler | 277/226 |
| 3,269,583 | 8/1966 | Fino | 220/226 |
| 3,333,725 | 8/1967 | Hirata et al. | 220/226 |
| 3,647,380 | 3/1972 | Middleton | 51/235 |

*Primary Examiner*—William H. Schultz
*Attorney, Agent, or Firm*—Maky, Renner, Otto & Boisselle

[57] ABSTRACT

A suction cup of resilient rubber-like material having affixed on the peripheral portion of its suction side a ring gasket of soft pliable putty-like material adapted to form a vacuum tight space therewithin when pressed against a non-porous supporting surface despite imperfections or irregularities in the surface to retain the suction cup by vacuum and adhesion, the adhesion being less than the cohesive strength of the gasket to enable removal and reuse of the suction cup by release of vacuum therewithin and pulling away from the surface to which applied.

6 Claims, 6 Drawing Figures

U.S. Patent
Nov. 2, 1982
4,356,989
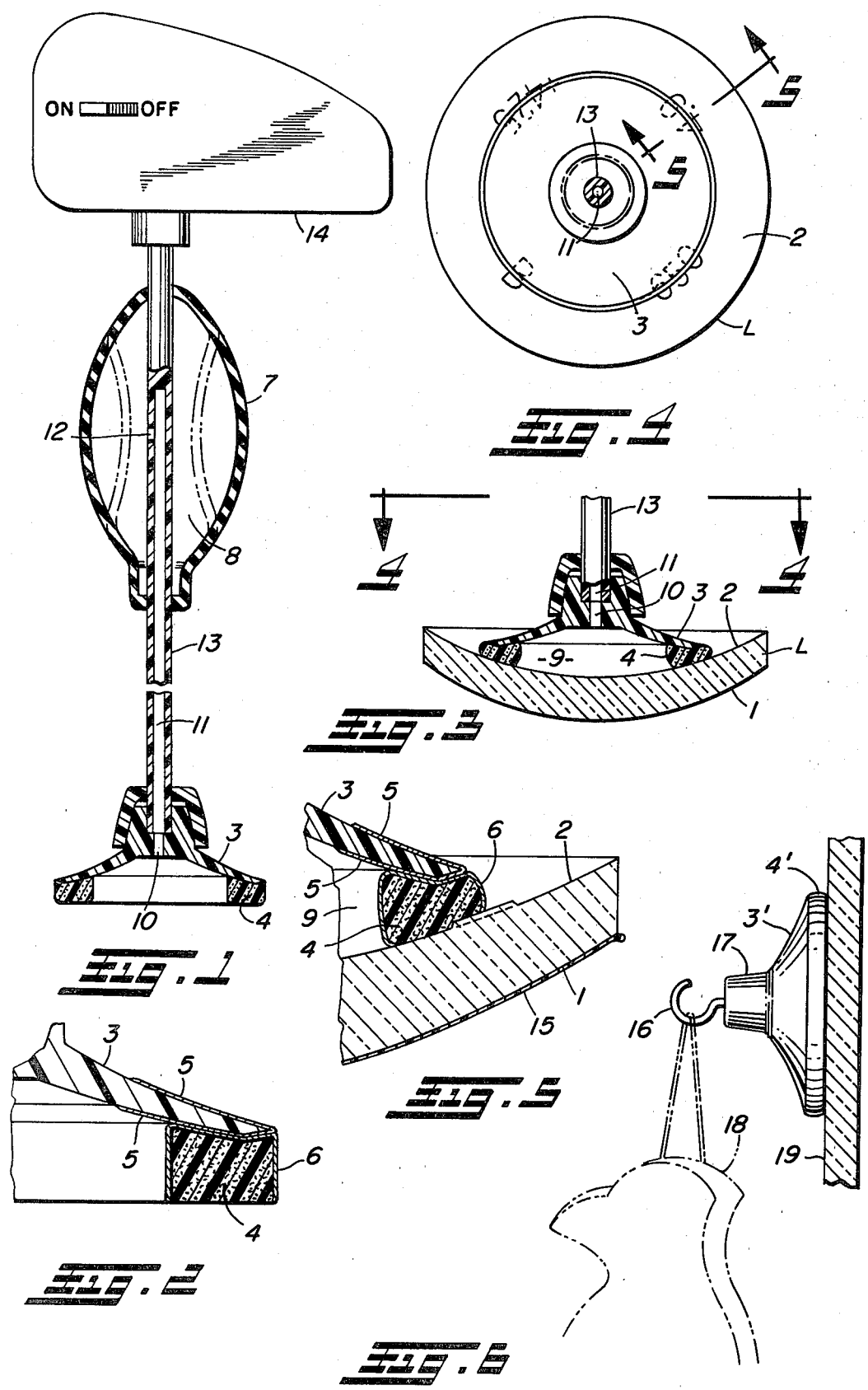

RESILIENT SUCTION CUP WITH SOFT PLIABLE SEALING GASKET

BACKGROUND OF THE INVENTION

Resilient rubber-like suction cups of vinyl, urethane, etc. are in prevalent use in supporting various objects, often ornaments or trinkets from surfaces of glass, tile, or other smooth non-porous surfaces. By reason of the resilient nature of such suction cup, the periphery thereof is not able to establish a vacuum-tight seal over imperfections or irregularities in the surface to which applied and hence such suction cups will fall off from time to time even from seemingly perfectly flat surfaces of glass.

In my copending application, Ser. No. 061,949, filed July 13, 1979, and entitled "Coating of Optical Lens for Blocking Purposes", a motor driven resilient suction cup having a vacuum releasing source is applied on the concave side of an optical lens for spin coating the convex side of the lens for blocking purposes. A low melting point blocking alloy is cast against the coating on the convex side thereof for mounting of the blocked lens in a grinding and polishing machine for grinding and polishing the concave side. In the method disclosed in said copending application, the downwardly facing convex side of the lens while held by the suction cup is dipped in the coating material in a can and upwardly withdrawn therefrom whereupon spinning of the lens about its vertical axis spreads out the coating material by centrifugal force as a uniform thickness film covering the convex side of the lens. Occasionally, if there is foreign matter on the concave side of the lens, or if there are imperfections on the concave side, such as to prevent the formation of a vacuum-tight seal between the lens and suction cup, the spinning lens may be dislodged from the suction cup either damaging the lens or throwing it off into the can of coating material with the bother of removing it from the can and cleaning off the coating material from both sides and peripheral edge.

Furthermore, some lenses are provided with raised characters, i.e., numbers and letters on the concave side which may make impossible the obtaining of a vacuum-tight seal when such suction cup is applied against the concave side of the lens.

SUMMARY OF THE INVENTION

A resilient suction cup of rubber-like material is provided having affixed thereto on the peripheral portion of its suction side a soft pliable putty-like ring gasket which establishes a vacuum-tight seal with any non-porous surface despite foreign matter, imperfections, or irregularities in the surface to retain the suction cup indefinitely by vacuum and adhesion or until the vacuum is released and the suction cup is pulled away from the surface to separate the gasket from the surface.

Other objects and advantages will appear from the ensuing description.

BRIEF DESCRIPTION OF THE DRAWING

FIG. 1 is a cross-section view of a suction cup embodying the present invention and having a motor-driven stem and a vacuum releasing source.

FIG. 2 is a radial cross-section view on much enlarged scale showing the preferred manner of cementing the ring gasket to the peripheral portion of the suction side of the suction cup.

FIG. 3 is a cross-section view showing the suction cup with its soft pliable ring gasket making vacuum-tight contact with the concave side of an optical lens.

FIG. 4 is a plan view as viewed along the line 4—4 FIG. 3 showing a typical lens with raised characters on its concave side.

FIG. 5 is a much enlarged radial cross-section view as viewed along the line 5—5 FIG. 4 showing how the soft pliable non-resilient gasket of the suction cup makes a vacuum-tight seal with the concave side of the lens despite irregularities such as the raised characters.

FIG. 6 shows a suction cup embodying the present invention as applied on a surface for supporting an ornament or trinket.

DETAIL DESCRIPTION OF A PREFERRED EMBODIMENT

Referring first to FIGS. 1–5, the optical lens L has a convex side 1 which is to be coated for blocking purposes and a concave side 2 which is to be ground and polished when the blocked lens is mounted on the spindle of a grinding and polishing machine. Herein the concave side 2 of the lens L has raised characters of about 0.005" height (see FIGS. 4 and 5) molded therein which, as well known in the art, denote lens specifications and which facilitate accurate set-up of the grinding and polishing machine for predetermined grinding and polishing of the concave side 2 of the blocked lens.

The suction cup 3 herein is of familiar form molded as of resilient plastic material such as vinyl, urethane, or other resilient rubber-like gas impervious material having affixed to the peripheral portion of its suction side, a ring gasket 4 of soft pliable non-resilient putty-like material, e.g., polyvinyl isobutyl. The gasket may also be described as being clay-like or caulk-like non-hardening compound which adheres slightly to smooth surfaces but with less force than the cohesive strength of the gasket material thus to enable ready removal and reuse upon release of vacuum within the suction cup and pulling away thereof from the surface to which it was attached. The gasket material may also be likened to slightly warmed bees wax or to a stiff paste which can form a vacuum-tight seal when applied to any non-porous surface despite foreign matter, irregularities, or imperfections in the surface. In fact, when the fingers are pressed against the gasket 4, the gasket material may show the fingerprints.

In the case of a vinyl suction cup 3 for example, a preferred arrangement for firmly securing the ring gasket 4 to the peripheral portion of the suction cup 3, is to provide a vinyl copolymer adhesive film 5 on both sides of the peripheral portion of the suction cup 3 and over the peripheral edge of the suction cup 3 as clearly shown in FIG. 2. Similarly, the gasket of polyvinyl isobutyl, for example, will have a vinyl copolymer film 6 on its upper side and on the outside and inside diameters thereof. Preferably the adhesive film 5 on the suction cup 3 is first allowed to dry and while the film 6 on the gasket 4 is still in tacky condition, the suction cup 3 is pressed against the upper side of the film 6 on the gasket 4. The flexible film 6 of adhesive on the outside diameter and inside diameter of the gasket 4 inhibits radial flow of the gasket material when the uncoated bottom side of the gasket 4 is applied against the concave side 2 of a lense L as shown in FIGS. 3, 4 and 5 or applied against the non-porous smooth surface of glass, tile, etc. and even the painted surface of a brick as shown in FIG. 6.

With reference to the lens L coating operation as referred to in detail in the aforementioned copending application Ser. No. 061,949, when it is desired to pick up a lens L for coating, the bulb 7 is squeezed and the bottom surface of the gasket 4 is pressed against the concave side 2 of the lens L to form a vacuum-tight seal despite foreign matter, imperfections, or irregularities such as the raised characters whereupon release of the bulb 7 will establish a partial vacuum in the spaces 8 and 9 within bulb 7 and within the suction cup 3 by way of the passages 10, 11, and 12 in the suction cup 3 and stem 13. When it is desired to release the lens L from the suction cup 3, the bulb 7 is squeezed further to increase the pressure in the spaces 8 and 9 from negative pressure to atmospheric pressure or to a slight positive pressure whereupon the lens L and suction cup 3 may be pulled apart overcoming the adhesion of the ring gasket 4 to the concave surface 2 of the lens L.

When the lens L is held on its concave side 2 by the suction cup 3, the downwardly facing convex side 1 is dipped in liquid coating material in a can, and then the lens L is withdrawn upwardly a slight distance above the level of the coating material to drain excess coating material adhering to the convex side 1 of the lens L. The motor 14 can then be energized to spin the lens L about its vertical axis to spread the coating material by centrifugal force as a uniformly thin film 15 (FIG. 5) over the convex side 1 of the lens L to create an edge buildup of coating material to form a thickened bead-like peripheral or rim portion at the periphery of the convex side 1 and to spin off excess coating material against the inside of the can for reuse.

The coated lens L is then blocked in well-known manner by casting a low melting point fusible alloy against the coated convex side 1 of the lens L. The film 15 of coating material on the convex side 1 of the lens L seals and protects the convex side 1 from grinding and polishing materials when the concave side is finished and protects the convex side 1 from heat, scratching, or marring during blocking during handling of the blocked lens L.

In FIG. 6, the suction cup 3' has no passage 10 therethrough and instead a hook 16 or the like is molded or otherwise secured in the central boss 17 of the suction cup 3' for hanging of a suitable colorful ornament or trinket 18. Otherwise the suction cup 3' of FIG. 6 is the same as shown in FIG. 2 so that when the suction cup 3' is pressed against a non-porous surface even a painted brick, the gasket 4' will conform to irregularities in the surface 19 to form a vacuum-tight seal within the suction cup 3' which will indefinitely retain the suction cup 3' both by vacuum and adhesion but, if it be desired to remove the suction cup 3' and to apply it elsewhere, it is a simple matter to deform it to release the vacuum and to pull it and the gasket 4' away from the surface 19.

To facilitate installation and removal of the suction cup 3' the boss 17 may have a check valve therein (not shown) which opens when the boss 17 is pressed toward surface 19 to vent air from the space within the gasket 4 and the flattened suction cup 3' and which closes when force on the boss 17 is released thus to establish a partial vacuum in said space as the suction cup 3' resiliently springs back toward its original conical shape. Likewise, when it is desired to remove the suction cup 3' and gasket 4' from surface 19, the boss 17 is pressed toward the surface 19 to increase the pressure within said space to approach or equal atmospheric pressure while tilting the boss 17 to pull the gasket 4' away from surface 19. The suction cup 3 in FIGS. 1 to 5 may also be provided with a check valve in lieu of the squeeze bulb 7. In such case, the suction cup 3—gasket 4 is applied to the concave side 2 of the lens L as described above whereupon the suction cup 3 and lens L may be driven by the elongated flexible drive shaft of the motor 14.

For a suction cup 3 or 3' of about 1⅝" diameter good results have been obtained with a gasket 4 or 4' of about 3/16" thickness and about ¼" radial width.

The embodiments of the invention in which an exclusive property or privilege is claimed are defined as follows:

1. A generally conical suction cup of resilient rubber-like material having affixed on the peripheral portion of its suction side a ring gasket of non-resilient putty-like material adapted to form a vacuum-tight space therewith when pressed against a rigid non-porous surface despite irregularities or imperfections in such surface; said gasket being affixed to said suction cup by an annular adhesive film thereon bonded to an adhesive film on said peripheral portion of the suction side of said suction cup.

2. The suction cup of claim 1 wherein the adhesive film of said suction cup extends over the peripheral edge thereof and over the peripheral portion of its atmospheric side.

3. The suction cup of claim 1 wherein the adhesive film on said gasket extends over the radially outer and inner surfaces of said gasket to inhibit radial flow of said gasket when pressed against a rigid non-porous surface.

4. A generally conical suction cup of resilient rubber-like material having affixed on the peripheral portion of its suction side a ring gasket of polyvinyl isobutyl adapted to form a vacuum-tight space therewith when pressed against a rigid non-porous surface despite irregularities or imperfections in said surface; said gasket being affixed to said suction cup by an annular adhesive film thereon bonded to an adhesive film on said peripheral portion of the suction side of said suction cup.

5. The suction cup of claim 4 wherein the adhesive film of said suction cup extends over the peripheral edge thereof and over the peripheral portion of its atmospheric side.

6. The suction cup of claim 4 wherein the adhesive film on said gasket extends over the radially outer and inner surfaces of said gasket to inhibit radial flow of said gasket when pressed against a rigid non-porous surface.

* * * * *